March 21, 1944.　　J. B. ARMITAGE　　2,344,529

MACHINE TOOL TRANSMISSION AND CONTROL MECHANISM

Filed Sept. 21, 1940　　10 Sheets-Sheet 1

INVENTOR:
JOSEPH B. ARMITAGE
BY: W. D. O'Connor
ATTORNEY.

March 21, 1944.    J. B. ARMITAGE    2,344,529
MACHINE TOOL TRANSMISSION AND CONTROL MECHANISM
Filed Sept. 21, 1940    10 Sheets-Sheet 4

INVENTOR:
JOSEPH B. ARMITAGE
BY: W. D. O'Connor
ATTORNEY.

March 21, 1944. J. B. ARMITAGE 2,344,529
MACHINE TOOL TRANSMISSION AND CONTROL MECHANISM
Filed Sept. 21, 1940 10 Sheets-Sheet 5

INVENTOR:
JOSEPH B. ARMITAGE
BY: W. D. O'Connor
ATTORNEY.

INVENTOR:
Joseph B. Armitage.
BY: W. D. O'Connor
ATTORNEY.

March 21, 1944.   J. B. ARMITAGE   2,344,529
MACHINE TOOL TRANSMISSION AND CONTROL MECHANISM
Filed Sept. 21, 1940   10 Sheets-Sheet 9

INVENTOR:
JOSEPH B. ARMITAGE.
BY: W. D. O'Connor
ATTORNEY.

Patented Mar. 21, 1944

2,344,529

UNITED STATES PATENT OFFICE 2,344,529

MACHINE TOOL TRANSMISSION AND CONTROL MECHANISM

Joseph B. Armitage, Wauwatosa, Wis., assignor to Kearney & Trecker Corporation, West Allis, Wis., a corporation of Wisconsin Application September 21, 1940, Serial No. 357,671

8 Claims. (Cl. 90—21)

This invention relates, generally, to improvements in machine tools and more particularly to an improved transmission and control mechanism for actuating the movable supporting elements of a machine tool.

A general object of the invention is to provide improved transmission and control mechanism for effecting movement of and for controlling the rate and direction of movement of the supporting elements of a machine tool.

Another object of the invention is to provide an improved transmission and control mechanism that is capable of effecting infinitely-variable changes in the rate of movement of the supporting elements of a machine tool throughout its full range of operation.

Another object of the invention is to provide an improved transmission and control mechanism for the movable work supporting elements of a machine tool, including an infinitely-variable speed drive mechanism housed within one of the movable work supporting elements.

Another object is to provide a machine tool support moving transmission including an infinitely-variable speed friction drive mechanism and having means to limit the torque load on the friction drive mechanism to prevent injury to it.

Another object is to provide an improved transmission and control mechanism for a milling machine of the knee type, having independent reversing mechanisms on the knee for each of three paths of movement of the work support, having two constant speed shafts transmitting power to the knee for actuating the work support selectively at feed or rapid traverse rate, and having an infinitely variable speed drive mechanism included in the feed transmission train whereby the feed rate of movement of the work support may be adjusted to any desired rate within the range of speeds of the transmission mechanism.

According to this invention, as embodies in a knee type milling machine, the improved transmission and control apparatus comprises an infinitely variable friction drive mechanism together with control means for selectively effecting movement of the knee, saddle and table of the machine at any preselected feed rate, there being also the usual means for selectively moving the table at rapid traverse rate. Power for actuating the several movable members is derived from a power source housed within the column and connected with the movable members by two constant speed power shafts, one shaft operating at feed rate and the other shaft operating at rapid traverse rate. Branch transmission trains for the feed drive are connected to transmit power at the selected feed rate from the infinitely variable speed drive mechanism contained within the knee, to the mechanisms for moving the knee, saddle and table of the machine, respectively the trains each including independent manually operable disconnecting and reversing mechanisms. The speed ratio of the infinitely variable drive mechanism may be controlled manually by turning a hand crank carried by the movable knee, the position of adjustment being indicated by a dial operatively associated with the crank. The rapid traverse transmission is carried by the movable knee and is provided with a manually operable rapid traverse clutch element that functions upon engagement to effect movement of the table at rapid traverse rate in accordance with the adjustment of the table clutch and reversing mechanism, an overrunning clutch permitting rapid movement irrespective of the feed drive transmission connections. Safety clutches are included in both the feed and rapid traverse transmission trains to provide means for automatically disengaging either train to prevent damage by reasons of any overload condition which may arise in the operation of the machine.

The foregoing and other objects of the invention, which will be more fully understood from reading the following detailed specification, may be achieved by the particular mechanism described herein by way of example in connection with the accompanying drawings illustrating a preferred embodiment of the invention; in which.

The particular machine tool shown in the drawings as illustrative of apparatus incorporating transmission and control mechanism embodying the present invention, is a milling machine of the knee and column type. Referring more particularly to the drawing, and especially to Figs. 1 and 2 thereof, the milling machine there shown comprises essentially a column 21 that serves to carry a horizontally disposed tool supporting spindle 22 rotatably journalled in the upper part thereof. In cooperating relationship with the spindle, the column 21 carries the usual work supporting elements including a vertically movable knee 23, carrying a transversely slidable saddle 24 which supports a longitudinally movable work table 25. The various structural elements, including the column, knee, saddle and table illustrated in the drawings are generally similar to corresponding elements shown and described in my U. S. Patent No. 2,182,421, issued December 5, 1939.

Power for rotating the tool supporting spindle 22 and for translating the work supporting elements along their three mutually transverse paths of movement, is derived from a power source which may be a constant speed electric motor 26 that is housed within the hollow base of the column 21. The motor 26 is operatively connected to drive a clutch pulley 27 rotatably mounted on the side of the column 21, by means of multiple belts 28. From the clutch pulley 27, power is transmitted to rotate the tool spindle 22 selectively at a predetermined speed, by means of well known spindle speed adjusting mechanism housed within the upper part of the column.

Figure 2:
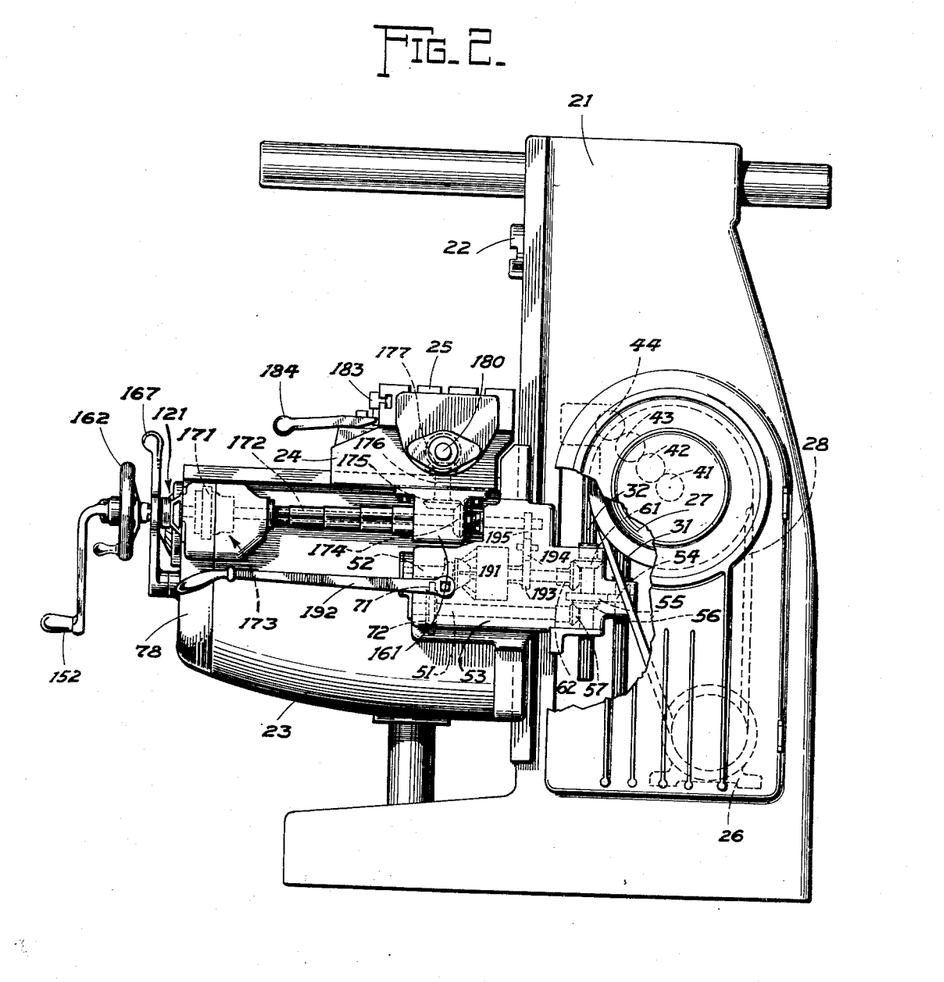
Fig. 2 is a right side elevational view of the machine shown in Fig. 1, parts having been broken away to disclose portions of the power transmission mechanism.

Power for actuating the movable work supporting elements is transmitted from the clutch pulley 27, by means of two power transmitting trains, a rapid traverse train arranged to be driven whenever the pulley 27 is rotated, and a feed rate train driven by means of the pulley clutch whenever the tool supporting spindle is being driven. Each of these trains is arranged to deliver power at a constant rate of movement to the vertically movable knee of the machine, the driving action being effected by means of slidable power connections including a vertically positioned splined feed rate shaft 31 and a similar splined rapid traverse rate shaft 32, disposed in adjacent parallel relationship at the right side of the column 21, as shown in Fig. 2 of the drawings.

Power for turning the feed rate shaft 31 is derived from a gear 33 (shown in Fig. 8) that is secured on a shaft 34 which is operatively connected to the spindle driving mechanism in such manner that the feed rate train is actuated whenever the spindle driving clutch in the pulley 27 is engaged to drive the tool spindle. As shown, the gear 33 meshes with a similar gear 35 fixed on a shaft 36 that also carries a worm 37 which meshes with a worm wheel 38 fixed on the upper extremity of the feed rate shaft 31, thus constituting a driving train arranged to rotate the vertical splined shaft 31 at a constant speed continuously whenever the shaft 34 is being driven from the pulley 27.

The rapid traverse rate shaft 32 is driven continuously from a gear 41 (see Figs. 2 and 8) that is formed integrally with the sleeve on which the pulley 27 is fixed. The rapid traverse driving train comprises gears 42, 43 and 44 driven serially from the gear 41, the gears 42 and 43 being idler gears and the gear 44 being mounted on a shaft 45. The gear 44 carries one portion of a safety clutch 46, that is more fully described hereinafter, the other portion of the safety clutch being fixed on the shaft 45. A worm wheel 47 fixed on the shaft 45 meshes with and drives a worm 48 fixed on the upper end of the vertically disposed splined rapid traverse shaft 32 the gearing functioning to turn the shaft 32 at a constant rapid traverse rate continuously whenever the motor 26 is in operation.

Figure 3:
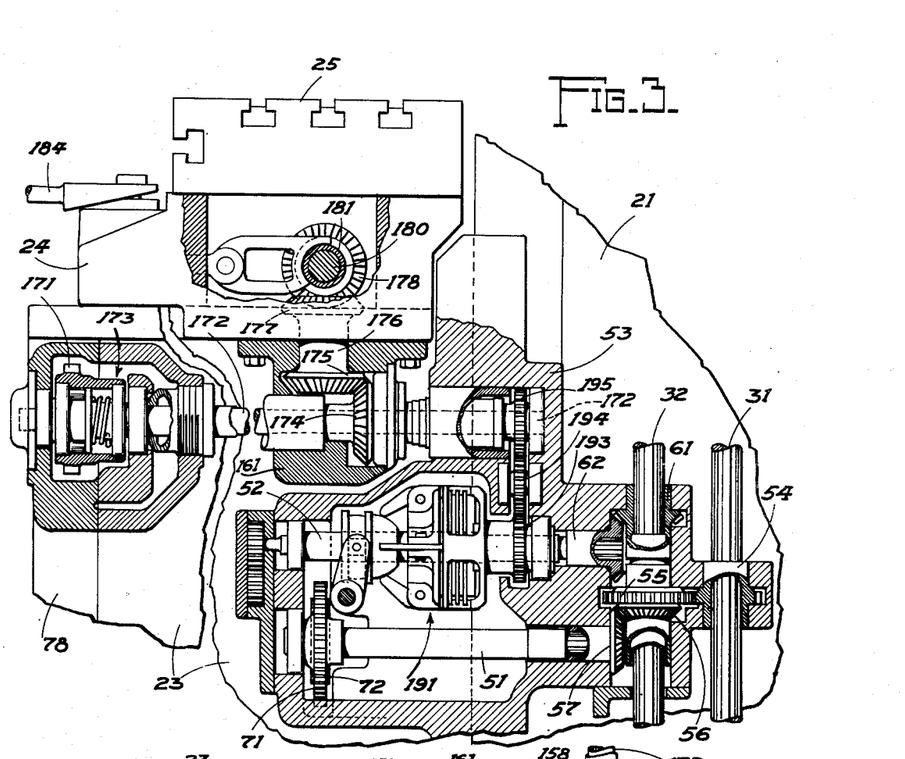
Fig. 3 is an enlarged fragmentary view taken from the right side of the machine, and showing portions of the feed and rapid traverse transmission trains.
Figure 8:
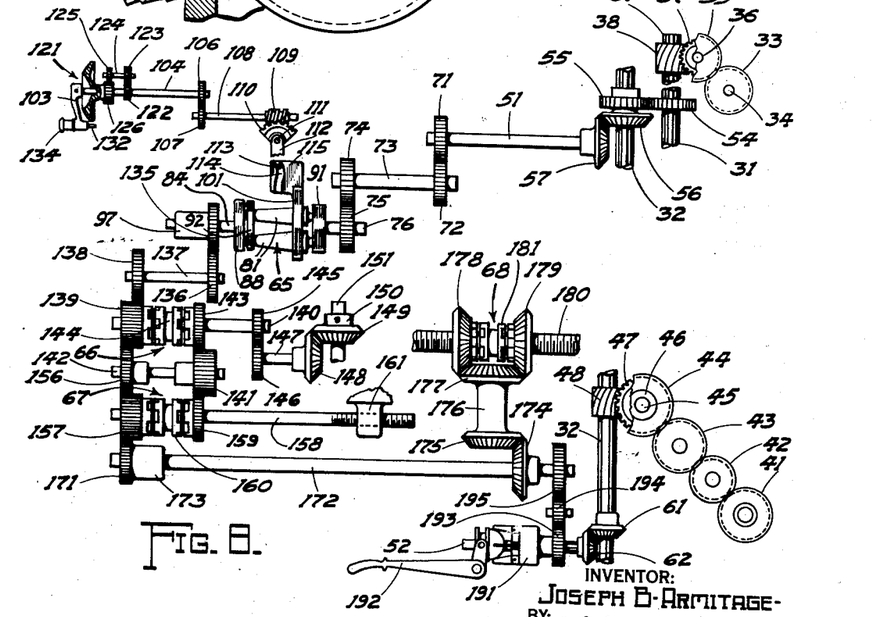
Fig. 8 is a schematic diagram of the improved transmission and control mechanism embodied in the milling machine shown.

From the two vertically disposed splined shafts 31 and 32, power is transmitted at constant speed to two horizontally disposed shafts 51 and 52 respectively, that are journalled in a bracket 53 carried on the right side of the vertically movable knee 23. The vertical splined shafts 31 and 32 extend through the bracket 53 in operative sliding relationship with gearing therein that is adapted to transmit power from shafts 31 and 32 to the horizontal shafts 51 and 52, respectively. As shown in Figs. 2, 3 and 8, the splined feed shaft 31 passes through a splined sleeve gear 54 that is rotatably mounted in the bracket 53 and is vertically movable therewith to maintain its driving relationship with the shaft 31 regardless of the position of the knee. The gear 54 meshes with a gear 55 journalled in the bracket 53 concentric with the shaft 32 but free from driving connection therewith. The gear 55 is provided on its under side with a bevel gear 56 that meshes with a bevel gear 57 secured on the end of the horizontal shaft 51. Thus the shaft 51 will be driven at a constant rate of speed whenever shaft 31 is being driven by the clutch pulley 27. The splined rapid traverse shaft 32 passes through the splined sleeve of a bevel gear 61 that is journalled for rotation in the bracket 53 and is disposed to move with the bracket as the knee 23 is elevated or lowered, thereby maintaining driving relationship with the shaft 32. The bevel gear 61 meshes with a similar bevel gear 62 fixed on the end of the horizontal shaft 52, whereby shaft 52 is driven at a constant speed by the gear train extending from the driven pulley 27 for effecting a rapid traverse rate of rotation of the shaft 52.

For effecting feeding movement of the work supporting elements at any desired feed rate within a predetermined range, there is provided within the hollow knee structure 23 an infinitely variable friction drive speed changing mechanism 65. The friction drive mechanism 65 is operatively connected to receive power from the constant speed feed rate shaft 51 and to transmit it at the desired rate to independent transmission trains for actuating the several work supporting elements in either direction selectively. For this purpose there are provided in each transmission train, an independently operable clutch and reverser mechanism designated 66, 67 and 68, respectively, arranged to control the establishment of a driving connection with, and the direction of movement of the knee 23, the saddle 24 and the table 25.

Power is delivered to the friction drive mechanism 65 from the feed rate shaft 51 by means of a gear 71 that is fixed on the shaft 51 in position to mesh with and drive a gear 72 secured to one end of a shaft 73 that also carries a gear 74 secured to its opposite end. The gear 74 meshes with and drives a gear 75 fixed on the outer end of a power input shaft 76 of the infinitely variable friction drive mechanism 65.

Figure 9:
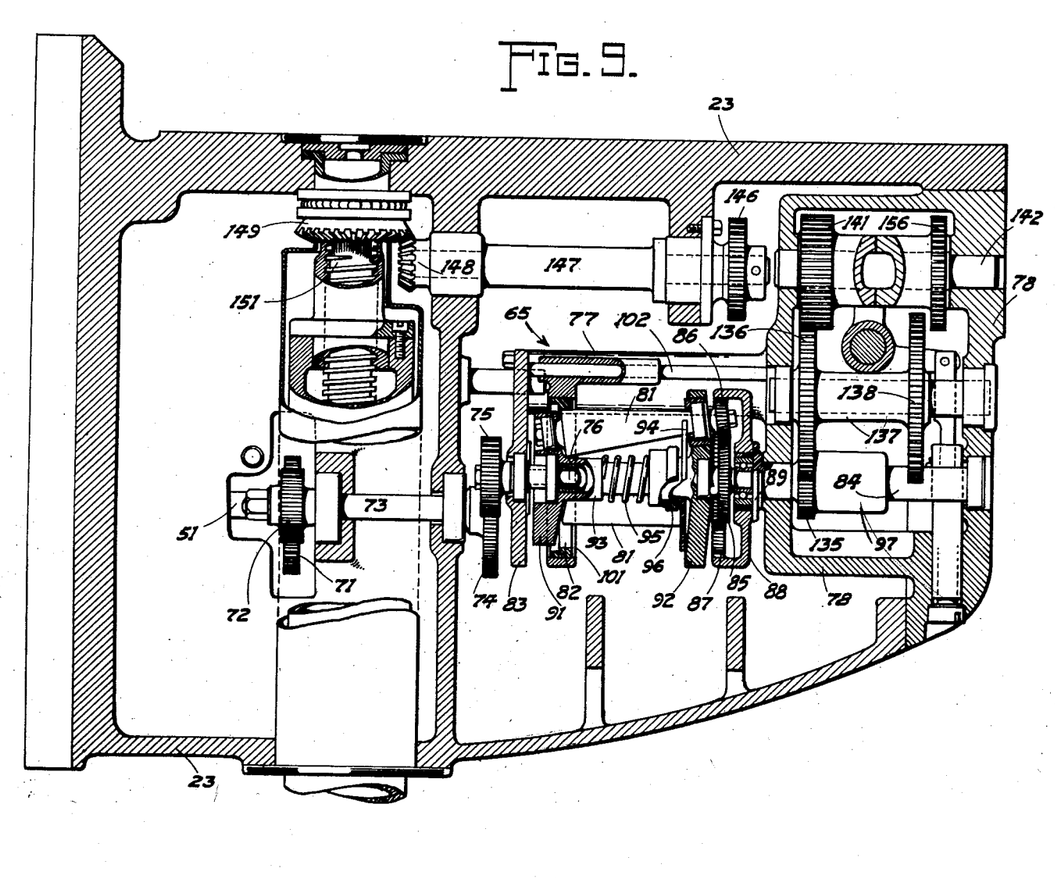
Fig. 9 is a vertical longitudinal section view taken through the knee and showing a portion of the feed transmission train including the infinitely variable drive mechanism.
Figure 10:
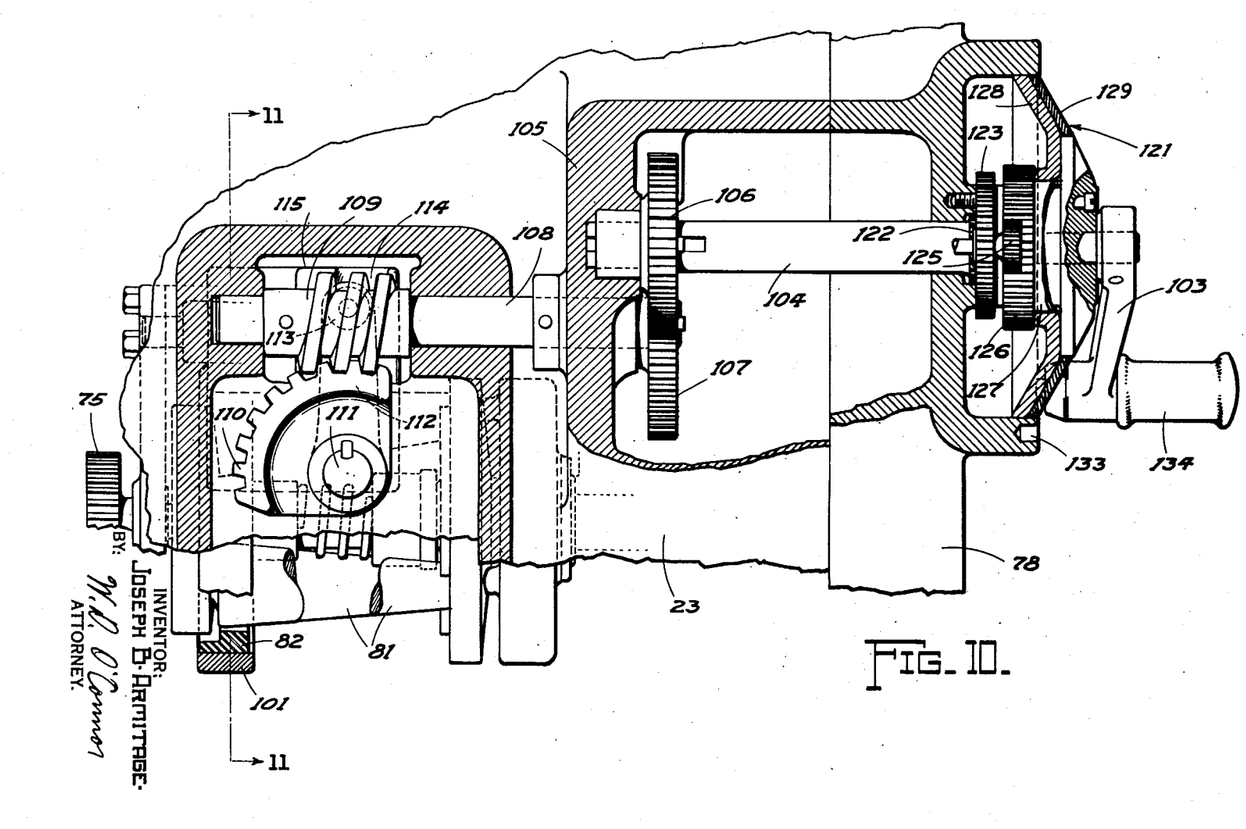
Fig. 10 is an enlarged vertical sectional view through a portion of the knee, taken substantially on the line 10—10 of Fig. 5 and showing the control mechanism for effecting manual adjustment of the infinitely variable speed drive mechanism to select the desired feed rate of movement for the knee, saddle and table of the milling machine.
Figure 11:
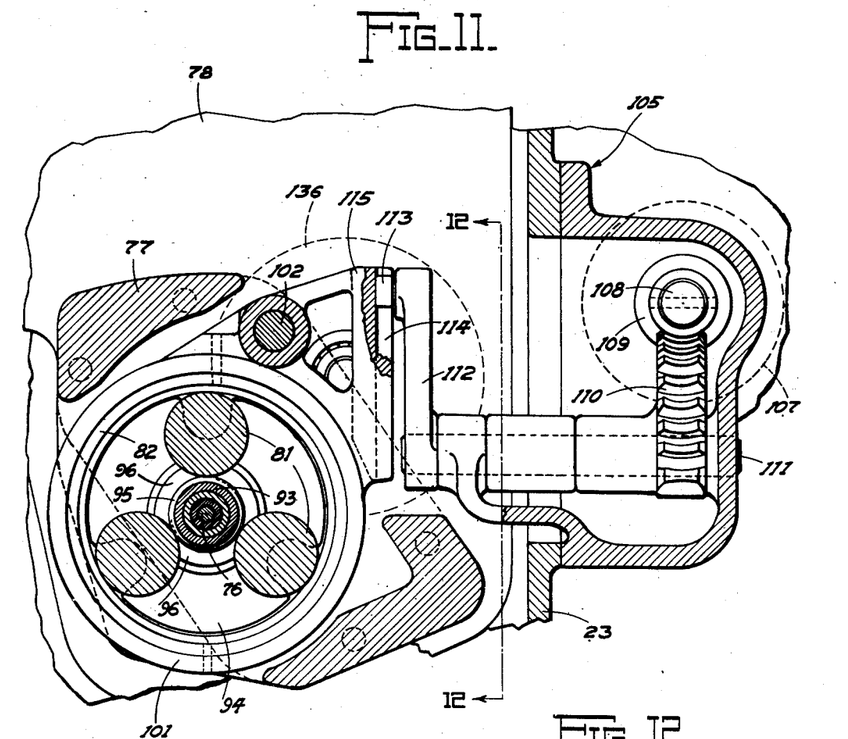
Fig. 11 is a transverse vertical sectional view, taken on the line 11—11 of Fig. 10 and showing the crank arm and associated mechanism operative to effect adjustment of the feed rate transmission mechanism.

As shown in Figs. 1, 9, 10, 11 and 12, the infinitely variable friction drive mechanism 65 is housed within the knee 23 and is mounted in a cage 77 that is preferably formed integrally with a removable control bracket 78 releasably attached to the front of the knee 23 by means of cap screws or the like. By this arrangement the entire feed rate transmission mechanism may be removed from the knee as a unit for inspection or repair merely by detaching and withdrawing the control bracket 78. The particular friction drive mechanism 65 shown in Figs. 9 and 11 is a well known commercial unit of the type shown in United States Patent No. 2,090,606 that comprises essentially a plurality of relatively inclined tapered rollers 81 and a cooperating encircling traction ring 82 adjustable lengthwise of the rollers to regulate the speed of their planetary action and consequently the ratio of the speed change effected by the mechanism.

As best shown in Fig. 9, the power input shaft 76 is supported at its outer end in a bearing carried by an end plate 83 secured to the cage 77 and is supported at its inner end by a bearing seated in a recess formed in the inner end of a power output shaft 84 of the mechanism 65. A sun gear 85 fixed to the power input shaft 76 meshes with a plurality of planet pinions 86 which in turn mesh with an internal orbit gear 87 formed on a hollow head portion 88 that is fixed to a flange 89 formed on the power output shaft 84. Each of the planet pinions 86 is fixed to an end of one of the tapered planet rollers 81 that in turn is frictionally engaged by the nonrotatable traction ring 82. The ring 82 encircles the several rollers 81 and coacts with them in such manner that when they are turned by the planetary gearing they are caused to progress within the ring and at the same time they cause the orbit gear 87 to turn, the speed of the orbit gear depending upon the rate of progression of the rollers as determined by the position at which the ring 82 engages them.

The tapered planet rollers 81 are journalled at their opposite ends in disks 91 and 92 of a spool shaped rotor 93 that is journalled in suitable bearings on the input shaft 76 for free rotation about the common axis of the power input and output shafts 76 and 84 respectively. As is customary in transmissions of this type, each roller 81 is inclined to the axis of the rotor 93 in such direction and to such degree that the outer surfaces of the rollers are tangent to the surface of an imaginary cylinder whose axis coincides with that of the rotor 93 and whose radius is that of the internal surface of the traction ring 82. In order to maintain sufficient pressure contact between the rollers 81 and the traction ring 82 to insure proper transmission of power without slip, provision is made for urging the rollers 81 outwardly along their inclined axes. The means for accomplishing this purpose comprises a spider 94 resiliently urged toward the right (as indicated in Fig. 9) by a coil spring 95 which surrounds the hub of the rotor 93 and is confined between a shoulder on the rotor and a nut 96 threaded on the hub of the spider 94 and that is adjustable to regulate the pressure of the spring 95. The spider 94 is cut away to accommodate the rollers and is provided with bearing engaging surfaces operable to contact the bearings fixed on the smaller end of each roller 81 to urge the rollers outwardly along their inclined paths under action of the spring 95.

In order to insure against the friction drive mechanism becoming overloaded through accidental interference with the movement of a work supporting element or similar cause, which might otherwise result in injury to the mechanism, the output torque is transmitted through a torque limiting safety clutch 97 that is connected to be driven by the output shaft 84. The safety clutch 97 may be generally similar in construction to the safety clutch 46 in the rapid traverse train, and it functions in the same manner in that it will slip under excessive torque to relieve the driving strain.

The traction ring 82 is supported for free radial movement within a carrier ring 101 that is slidably and swingably mounted on a guide rod 102 fixed in the cage 77 that supports the drive mechanism 65. By this arrangement, the ring 82 is free to adjust itself to the peripheries of the rollers 81 and is adapted to be moved longitudinally thereof.

Figure 4:
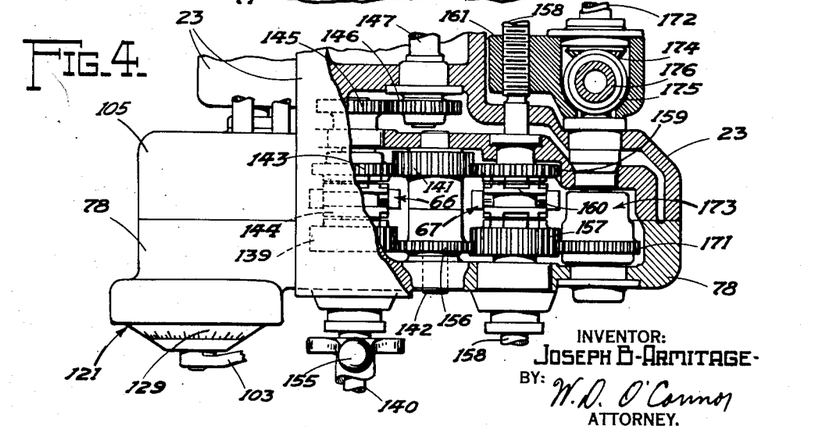
Fig. 4 is a fragmentary top plan view of the forward part of the knee, with parts broken away to show portions of the knee, saddle, and table transmission mechanism.
Figure 5:
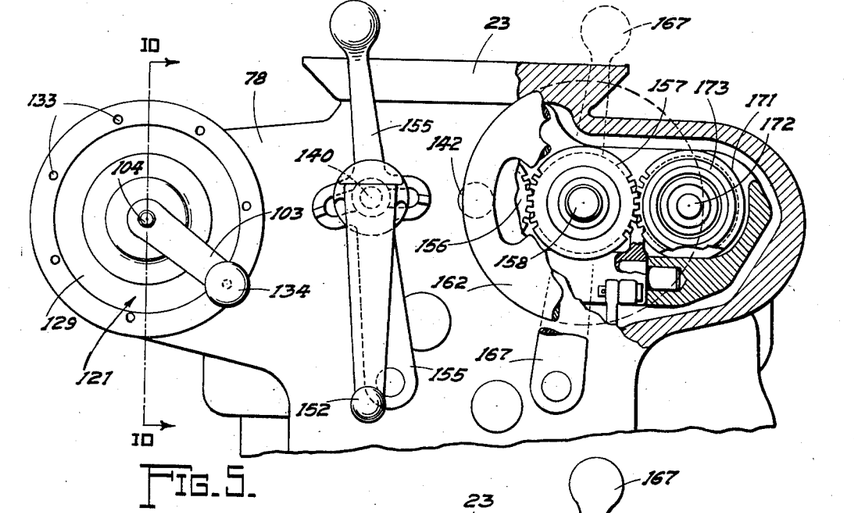
Fig. 5 is a fragmentary front elevational view of the knee showing some of the transmission control mechanism, parts having been broken away to disclose a portion of the power transmission mechanism.
Figure 6:
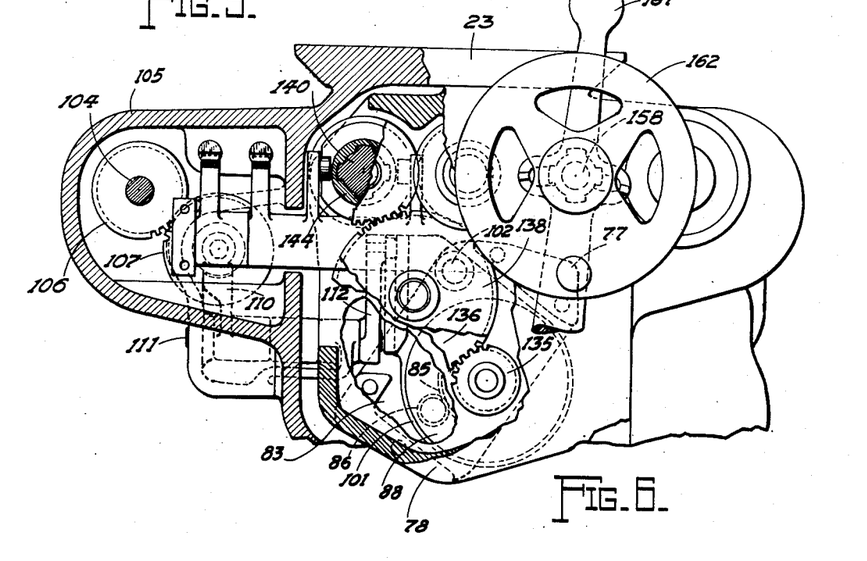
Figs. 6 and 7 are views similar to Fig. 5 but with parts broken away to show additional portions of the control and transmission mechanisms.

The control mechanism which operates to move the traction ring 82 longitudinally along the planetary rollers 81 to regulate the speed of the power output shaft 84 of the infinitely variable friction drive mechanism 65, is shown in Figs. 10 to 14. This mechanism comprises a hand crank 103 secured to the outer end of a shaft 104 projecting at the front of the knee 23, the shaft being rotatably mounted at its forward end in the control bracket 78 and journalled at its rearward end in a suitable bearing in a bracket 105 secured to the side of the knee 23, as shown in Fig. 4. A gear 106 fixed to the shaft 104 adjacent to the rearward end thereof meshes with and drives a gear 107 secured to the forward end of a shaft 108 also journalled in the bracket 105. A worm 109 pinned to the shaft 108 meshes with a worm wheel segment 110 keyed to a stub shaft 111 that is journalled in the bracket 105 and extends transversely with respect to the shaft 108.

Figure 12:
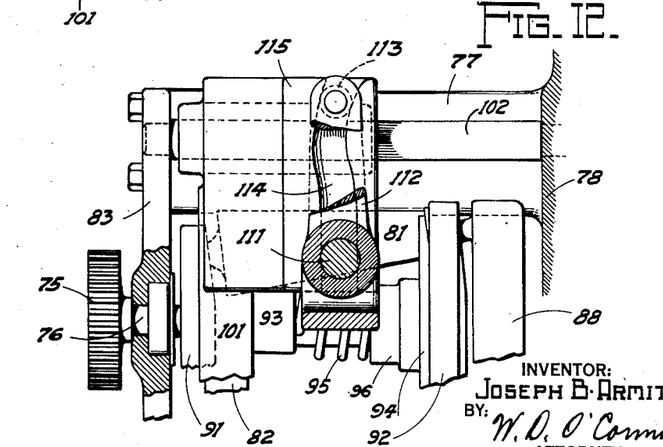
Fig. 12 is a vertical sectional view taken substantially on the line 12—12 of Fig. 11 and showing part of the movable friction ring together with means for controlling its movement under action of the manually operable adjusting means.
Figures 13, 14:
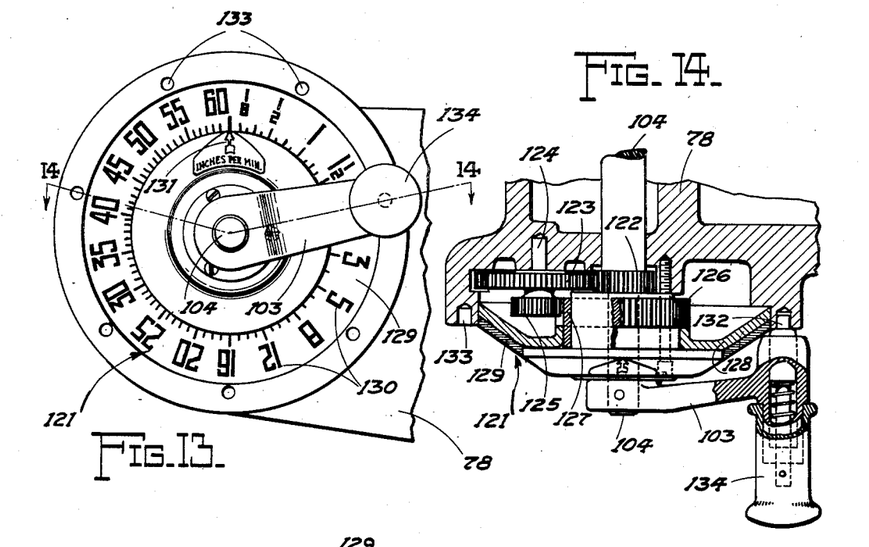
Fig. 13 is a fragmentary front elevational view of the upper left hand portion of the knee showing the manually operable feed rate adjusting means together with the movable feed rate indicating dial.
Fig. 14 is a horizontal sectional view, taken on the line 14—14 of Fig. 13 and showing the dial operating gearing and the spring urged detent means carried by the crank handle for releasably retaining the dial mechanism in any one of a plurality of definite positions of adjustment.

As shown in Figs. 11 and 12, a crank arm 112 fixed to the inner end of the shaft 111 carries a cam roller 113 rotatably mounted on a pin anchored in the arm. The cam roller 113 is disposed to cooperate with a cam groove 114 of predetermined shape formed in a plate 115 integral with the carrier ring 101. Through the action of this control mechanism, rotation of the hand crank 103 causes the traction ring to be moved longitudinally along the several rollers 81. In order that the amount of movement of the ring 82 may be translated into a useful measure of speed such as inches per minute of feed travel of the movable knee, saddle and table elements 23, 24 and 25, respectively, a graduated dial 121 is incorporated in the control mechanism, the dial being rotatably mounted on the front of the knee concentric with the crank 103, as shown in Fig. 13.

The graduated dial 121 is rotated from the shaft 104 (see Figs. 8 and 14) through a train of gears comprising a gear 122, fixed to the shaft 104, that meshes with and drives a gear 123 secured to a stub counter shaft 124. The shaft 124 also carries a pinion 125 that meshes with and drives a gear 126 formed on a sleeve element 127 that is rotatably mounted on a stationary hub portion carried by the bracket 78. A dial backing element 128 is secured to the sleeve 127 and a plate 129 on which graduations 130 are marked is secured to the backing element 128. The hub on the bracket 78 carries an indicator arrow 131 which when read against the dial graduation 130 gives an accurate reading of the feed in inches per minute adapted to be transmitted to the movable knee 23, saddle 24, and table 25 of the machine for the particular dial setting.

The scale of the dial graduations 130 may be arranged in any convenient manner to provide the desired characteristics for the speed changing movements. In the particular dial shown in Fig. 13 for instance, the indicia representing rates of feeding movements are arranged with progressively decreasing spacing from the low rate end to the high rate end of the scale. In the region of the low rate end where the rates are expressed in fractions of an inch of movement per minute, the indicia are spread over a considerable sector of the dial to facilitate selective proportional adjustments. At the other end of the scale, the indicia representing the higher rates of feeding movement are arranged with substantially uniform close spacing throughout a sector extending over nearly one-half of the dial. The selected progressive arrangement of indicia does not necessarily follow any particular mathematical law, but is chosen for convenience in operating the machine.

In the arrangement illustrated, when the control mechanism is operating in the region of the high rate end of the dial scale, the crank arm 112 is in the general position shown in Fig. 10. Movement of the dial in this region causes the cam roller 113 to move substantially parallel with the direction of movement of the traction ring 82, thereby effecting relatively large changes in speed. As the low rate end of the scale is approached, the degree of angularity of the arm 112 relative to the direction of movement of the ring 82 increases and the amount of change in speed becomes less in proportion to the amount of movement of the dial, the cam groove being shaped to effect exactly the desired speed changing movements indicated by the dial scale 130.

The means for releasably retaining the hand crank 103 in selected position comprises a latching mechanism including a spring urged plunger 132 arranged to cooperate with a series of angularly spaced holes 133, seven in the present instance, formed in the face of the bracket 78 adjacent to the periphery of the dial 121, the plunger being carried by a handle 134 mounted on the crank 103. This particular control mechanism affords a choice of sixty-three different speeds or rates of feeding movement ranging from one-eighth of an inch to sixty inches per minute.

Figure 7:
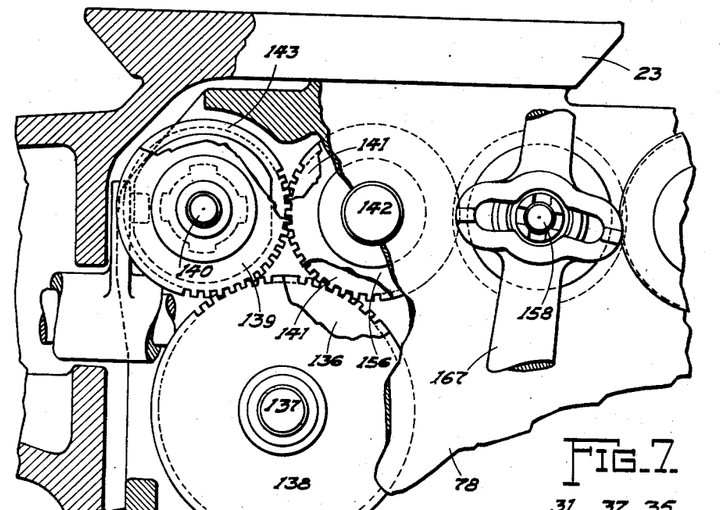

With the speed of the power output shaft 84 determined by adjustment of the crank 103, power is transmitted selectively to the knee 23, the saddle 24 and the table 25 through transmission mechanism including the safety clutch 97 secured to the output shaft 84. As shown in Figs. 8 and 9, the safety clutch 97 is connected to drive a gear 135 meshing with and driving a gear 136 fixed on an idler shaft 137 that is journalled in the control bracket 78, and that carries another driving gear 138. The gear 138 meshes with and drives a gear 139 (Figs. 4, 7 and 8) journalled for rotation on a knee driving shaft 140. The driven gear 136 fixed on the shaft 137 also meshes with and drives an idler gear 141 journalled for free rotation on an idler shaft 142, as shown in Figs. 7 and 9, and constituting part of the knee reversing mechanism 66. The gear 141 meshes with and drives a gear 143 also journalled for free rotation on the shaft 140 concentric with but spaced from the gear 139, the arrangement of the gearing being such that gears 139 and 143 are rotated in opposite directions. The adjacent sides of the gears 139 and 143 are provided with clutch teeth adapted to be engaged selectively by a shiftable toothed clutch collar 144, of the clutch and reverser mechanism 66, that is slidably mounted on a splined portion of the shaft 140. The clutch collar 144 may assume a central or neutral position wherein the collar is free from engagement with the clutch teeth of either gear 139 or 143, or it may be moved to either of two extreme positions wherein the collar is engaged with the clutch teeth on one or the other of the gears 139 or 143 to establish a driving connection between the selected gear and the knee driving shaft 140 for effecting rotation of the shaft 140 in the desired direction.

The shaft 140 has fixed thereon a spur gear 145 that meshes with and drives a mating gear 146 fixed on a shaft 147 journalled in the knee 23. The shaft 147 has fixed thereon a bevel gear 148 that meshes with and drives a bevel gear 149 having a hub or sleeve 150 rotatably mounted in the knee and secured to the upper end of a knee elevating screw 151. The screw 151 cooperates with an internally threaded nut projecting upward from the machine base, in manner to effect selective elevating or lowering of the knee in accordance with the position of the clutch collar 144 of the clutch and reverser mechanism 66. Manual movement of the knee may be effected by rotation of a hand crank 152 engageable with the shaft 140.

The knee actuating clutch collar 144 of the clutch and reverser mechanism 66 may be operated either automatically by means of trip dogs 153 and 154 (Fig. 1) releasably retained in adjusted position on the column 21, or manually by manipulation of a hand lever 155 in a manner fully disclosed and described in my previously mentioned U. S. Patent No. 2,182,421.

Figure 1:
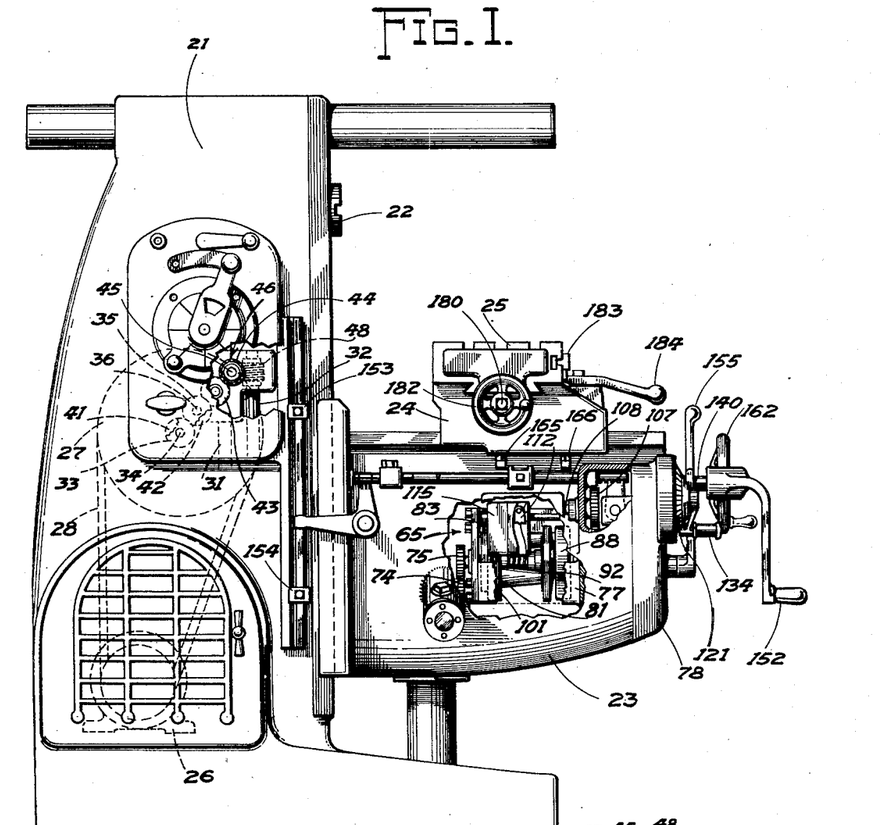
Figure 1 is a left side elevational view of a horizontal-spindle knee-type milling machine embodying the novel features of the present invention, parts having been broken away to show portions of the internal structure of the machine.

The gear 139 meshes with and drives an idler gear 156 freely rotatable on the shaft 142. The idler gear 156 meshes with and drives a gear 157 journalled for free rotation on a saddle driving shaft 158. A gear 159 also journalled for free rotation on the shaft 158 is driven from the idler gear 141, the arrangement of the gearing being such that gears 157 and 159 are rotated in opposite directions on the shaft 158. The adjacent sides of the gears 157 and 159 are provided with clutch teeth adapted to be engaged selectively by movement of a toothed clutch collar 160 of the clutch and reverser mechanism 67, that is slidably mounted on a splined portion of the shaft 158. The clutch collar 160 may assume any one of three positions, neutral wherein no drive is transmitted to the shaft 158, or either one of two extreme positions wherein rotation is imparted to the shaft 158 in one or the other direction. The shaft 158 is provided with a screw threaded portion that extends through a threaded aperture in a lug 161 carried by the saddle 24 to impart movement to the saddle at the rate determined by the setting of the dial 121 and in a direction determined by the position of the clutch collar 160 of the clutch reverser mechanism 67. Manual movement of the saddle 24 may be effected by rotation of a hand wheel 162 engageable with the shaft 158 to rotate the same and produce relative movement between the saddle 24 and the knee 23.

The clutch collar 160 of the clutch and reverser mechanism 67 may be operated either automatically by means of trip dogs 165 and 166 (Fig. 1) releasably retained in adjusted position on the saddle 24 or manually by manipulation of a hand lever 167 in a manner fully disclosed and described in the previously mentioned U. S. Patent No. 2,182,421.

The gear 157 carried by the saddle driving screw 158 meshes with and drives a gear 171 that is coupled to a table driving shaft 172 through an overrunning clutch mechanism, 173. The shaft 172 has a bevel gear 174 slidably mounted thereon and disposed in meshing engagement with a similar bevel gear 175 formed integral with a sleeve 176 that also carries a second bevel gear 177 which meshes with and drives a pair of oppositely disposed bevel gears 178 and 179 journalled for free rotation on a table feed screw 180. The bevel gears 178 and 179 are provided on their adjacent sides with clutch teeth adapted to be selectively engaged by a toothed clutch collar 181, of the clutch and reverser mechanism 68, that is slidably keyed to the table screw 180. The clutch collar 181 may assume three positions, a central or neutral position in which no power is transmitted to the table screw 180, or either one of two extreme positions in which power is directed in one or the other direction to the table feed screw to drive it at the speed indicated on the dial 121 and in the selected direction. Manual movement of the table 25 may be effected by rotation of a hand wheel 182 engageable with the table feed screw 180 to rotate it and produce relative movement between the table 25 and the saddle 24.

The clutch collar 181 of the clutch and reverser 68 may also be operated either automatically by means of the usual trip dogs 183 (one of which is indicated on Fig 1) adjustably secured to the table, or manually by means of the lever 184 in a manner fully described in the previously mentioned U. S. Patent No. 2,182,421.

As shown in the drawings, Figs. 3 and 8, the rapid traverse drive is utilized for the purpose of effecting rapid traverse movement of the table 25 only. However, by transferring the overrunning clutch mechanism 173 from the position in which it is shown, as a coupling between the gear 171 and the shaft 172, to a position in which it is associated with the safety clutch 97 in effecting a driving connection between the power output shaft 84 of the infinitely variable friction drive mechanism 65 and the gear 135, rapid traverse may be made available for the saddle 24 and the knee 23 as well as the table 25.

To provide for selectively moving the table 25 at rapid traverse rate, the rapid traverse shaft 52 is provided with a rapid traverse friction clutch 191 that may be engaged by lifting a rapid traverse lever 192 that is pivotally mounted in the side of the knee 23 to its elevated position to couple the shaft 52 with a gear 193 that is formed integral with one element of the clutch 191. The rapid traverse gear 193 meshes with and drives an idler gear 194 that in turn drives a gear 195 secured to the table driving shaft 172. Since the speed of the rapid traverse drive is greater than the speed of the feed rate drive, the shaft 172 will overrun the feed drive gear 171 by reason of the action of the overrunning clutch mechanism 173 which forms a power transmitting coupling between the gear 171 and the shaft 172 for effecting movement of the table 25 at a feed rate. The rapid traverse clutch mechanism is so designed that rapid traverse movement is maintained only when the lever 192 is held in its elevated position, release of the lever permitting it to move by gravity to a position in which the rapid traverse clutch 191 is disengaged.

Figure 18:
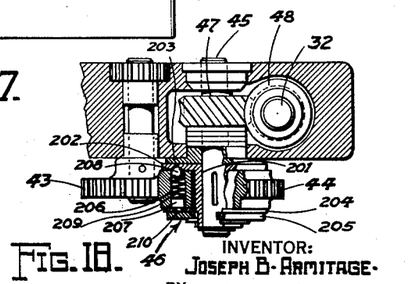
Fig. 18 is a sectional view, taken on the line 18—18 of Fig. 17, with parts broken away to show the structure of the safety clutch.

The safety clutch 46 that is built into the gear 44 of the rapid traverse drive, provides a means for automatically disconnecting the rapid traverse rate transmission train in the event of an overload. As shown in Fig. 18, (Sheet 1), the safety clutch 46 comprises a sleeve 201 keyed to the shaft 45 and provided with a flange 202 having a series of indentations or recesses 203 disposed in a circle concentric with the sleeve 201 on the face of the flange lying adjacent to one side of the gear 44. A friction washer 204 that is free to rotate on the sleeve 201 is disposed adjacent to the opposite side of the gear 44. A backing washer 205 keyed to the sleeve 201 to rotate therewith is retained against axial movement on the sleeve by means of a snap ring fitted in an annular groove formed in the sleeve 201. Likewise, the several elements of the clutch 46 are retained against axial movement on the shaft 45 by means of a snap ring fitted in an annular groove formed in the shaft 45.

The means for retaining the gear 44 in driving relationship with the sleeve 201 under normal transmission loads comprises spring urged mechanism carried in the hub of the gear 44. The hub portion of the gear 44 is provided with a plurality of holes or bores 206, disposed axially in circumferentially spaced relationship about the axis of the gear, each bore containing a plunger 207 and a ball 208 with a coil spring 209 interposed between them. The coil springs 209 serve to urge the balls 208 into the indentations 203 formed in the flange 202 and at the same time they urge the plungers 207 outwardly to maintain the washer 204 in frictional contact with the backing washer 205 keyed to the sleeve 201. To prevent rotation of the washer 204 relative to the plungers 207, each plunger is provided with an extending pin 210 of reduced diameter which engages a cooperating hole in the washer.

Since in the rapid traverse transmission the speed of operation is high, it will be understood that when the rapid traverse clutch lever 192 is operated to engage the clutch 191, a shock load will be impressed upon the safety clutch mechanism 46. Because of the design of the safety clutch mechanism the initial shock of a transmission load will tend to increase the capacity of the safety clutch rather than cause it to slip immediately. This action is accomplished by reason of the fact that relative movement between the sleeve element 201 and the gear 44 tends to dislodge the balls 208 from the recesses 203 in which they are resting. This results in an increased compression of the coil springs 209 which increased compression results in greater pressure between the washers 204 and 205, thereby increasing the friction between them and temporarily increasing the capacity of the safety clutch 46 to resist the shock load. However, should the load remain above the normal transmission load, this increased frictional resistance will be overcome and the clutch will slip to provide the desired safety against damage to the transmission by sustained loads in excess of those deemed to be normal.

Figures 15, 16:
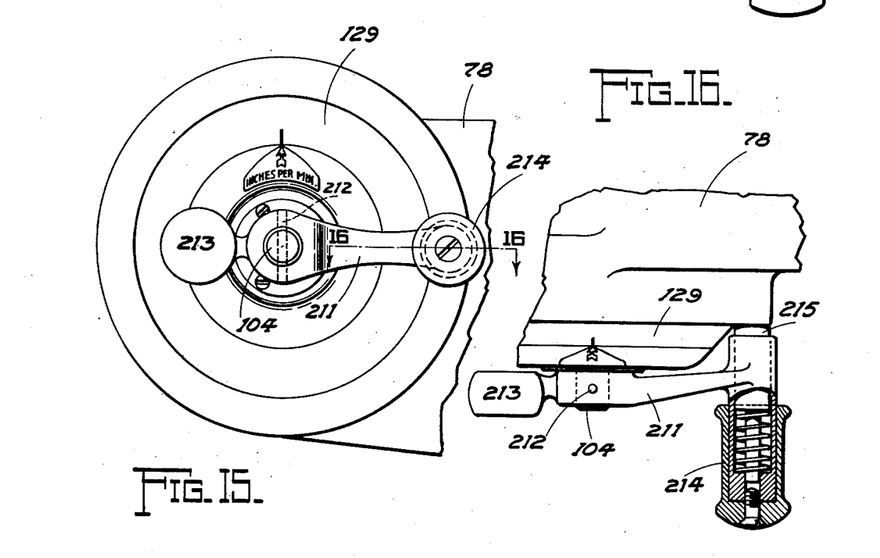
Fig. 15 is a view similar to Fig. 13 but showing a modified dial structure adapted to be frictionally retained in an infinite number of positions within the range of the variable speed drive mechanism.
Fig. 16 is a sectional view, taken on the line 16—16 of Fig. 15 and showing the spring urged friction shoe operative to frictionally retain the control mechanism in any selected position of adjustment.
Figure 17:
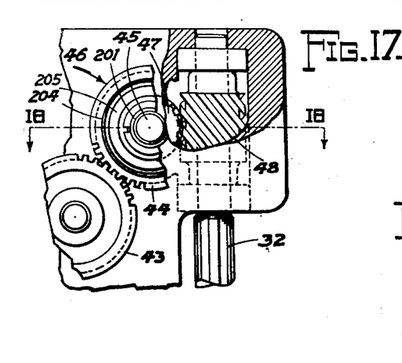
Fig. 17 (Sheet 1) is an enlarged detail view of a portion of the feed and rapid traverse take-off bracket positioned on the column of the machine and showing a part of the rapid traverse transmission including the rapid traverse safety clutch.

Another form of the manually operable dial adjusting crank is shown in Figs. 15 and 16. As there shown, a crank 211 is secured to the shaft 104 by means of a pin 212 and is provided with a counterweight portion 213 adapted to counterbalance the weight of a crank operating handle 214 which carries a self-contained spring urged friction shoe 215, the arrangement being such that the frictional pressure of the shoe 215 on the face of the bracket 78 will be sufficient to retain the crank 211 in any position of angular adjustment to which it may be turned. By utilizing a dial adjusting mechanism of the type just described, it will be understood that any of an infinite number of speeds may be selected for the variable speed transmission mechanism 65 within its speed range which in this instance is indicated as being from one-eighth of an inch to sixty inches of feed per minute.

Figure 19:
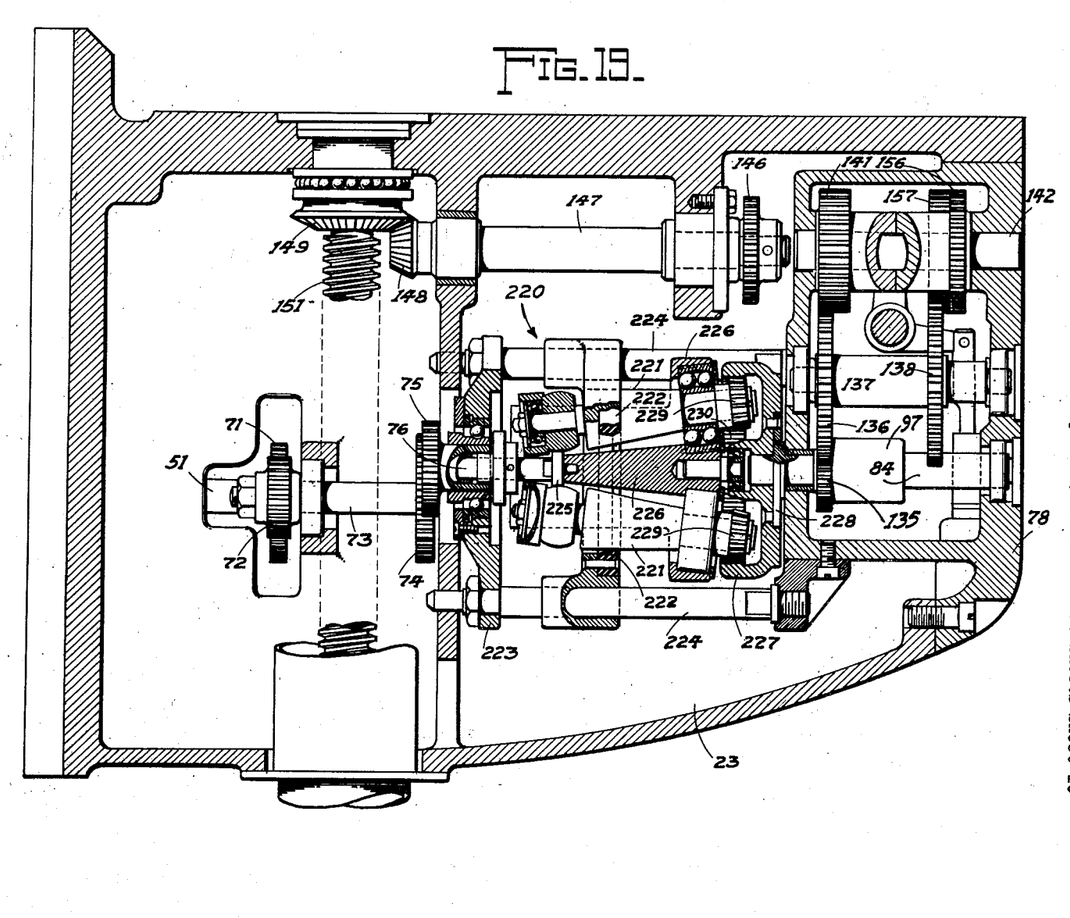
Fig. 19 is a view in vertical longitudinal section through the knee, generally similar to Fig. 9 but showing a modified form of the infinitely variable friction drive mechanism.

A modified form of infinitely variable friction drive mechanism 220 shown in Fig. 19 may be housed within the knee 23 and incorporated in the feed rate transmission to accomplish results similar to those obtained by the use of the previously described infinitely variable friction drive mechanism 65. The mechanism 220 is also a well known commercial unit of the type shown in United States Patent No. 2,178,399, that comprises essentially a pair of diametrically opposed relatively inclined tapered rollers 221 and an encircling traction ring 222 adjustable lengthwise of the rollers 221 to regulate the speed of their planetary action. The control mechanism operable to effect longitudinal movement of the traction ring 222 may be identical with that previously described for moving the traction ring 82 of the first mentioned infinitely variable drive mechanism 65.

The power input shaft 76 of the transmission mechanism 220 is supported in a bearing carried by an end plate 223 attached to the ends of guide rods 224 that are secured at their other ends to the removable control bracket 78. The inner end of the power input shaft 76 is slotted to receive the head of a cam element 225 that is provided with a stub shaft receivable in a centrally disposed longitudinal bore formed in a roller carrier 226. The roller carrier is supported at its opposite end in a bearing seated in a recess formed in a head 227 that is secured to a flange 228 formed on the power output shaft 84 journalled in the removable control bracket 78.

The tapered rollers 221 are journalled at their opposite ends in bearings mounted in the carrier 226. The bearings on the inner ends of the rollers 221 are guided for radial movement, under the action of the cam 225, in a slot formed in the inner end of the carrier 226. As radial movement is imparted to the inner ends of the rollers 221, the bearings on the outer ends of the rollers adjust themselves on the arcuately formed surface of the outer bearing race. The carrier 226 is driven by the cam 225 the camming action of which also imparts a radial pressure to the rollers to maintain them in driving pressure contact with the traction ring 222 to insure proper transmission of power without slip. Each roller 221 carries a planet gear 229 that meshes with an orbit gear 230 formed on the hollow head 227. As the carrier 226 is rotated, the planetary rollers 221 carried thereby are rotated about the axis of the carrier and the frictional contact between them and the traction ring 222 imparts rotating movement to the tapered rollers on their several independent axes. Rotation of the rollers 221 on their independent axes results in the movement of the orbit gear 230 with respect to the carrier 226 to transmit a rotating movement to the power output shaft 84 of the variable speed drive mechanism 220 at a speed determined by the position of axial adjustment of the traction ring 222 on the tapered rollers 221.

From the foregoing explanation of the construction and operation of the illustrated embodiments of the invention, it is apparent that there has been provided an improved transmission and control mechanism that is capable of effecting an infinite number of variable speed changes throughout its full range of operation with facility and accuracy and that has marked advantages over systems effecting only a relatively small number of definite speed ratio changes. In addition, the control system for the transmission is so constructed that a cooperating dial indicates the exact speed of movement transmitted to a movable element of the machine in inches or fractions thereof per minute for any selected setting of the control mechanism.

While the invention has been shown and described as applied to the transmission and control of the rate of feeding movements of the knee, saddle and table of a milling machine in combination with means operable to selectively impart a rapid traverse movement to the table of the machine, it is to be understood that the improved transmission and control mechanism may be applied with equal facility to any machine tool wherein it is desired to provide means for infinitely varying the feed rate of a movable element while providing means for selectively transmitting a rapid traverse movement to the movable element without the necessity of manually disengaging the feed rate transmission.

Although particular structures have been shown and described in considerable detail as exemplary of the manner in which the invention may be practiced, it will be apparent to those skilled in the art to which this invention relates, that various modifications of the structure herein shown and described may be effected without departing from the spirit and scope of the invention as defined in the subjoined claims.

The principles of the invention having now been fully explained in connection with the foregoing description of illustrative embodying apparatus, the invention is hereby claimed as follows:

1. A milling machine comprising a column, a hollow knee slidably mounted on said column, a work supporting table carried by said knee, a bracket removably mounted on said hollow knee, an infinitely variable friction drive speed changing mechanism mounted on said bracket in manner to be housed within said hollow knee, selective work support moving trains mounted on said bracket and operatively connected to be driven by said friction drive mechanism, said drive mechanism and connected trains being removable from said knee as a unit with said bracket, and means to drive said friction speed changing mechanism for actuating said work supporting table in a direction selected by adjustment of said support moving trains and at a rate selected by adjustment of said mechanism.

2. In a milling machine having a column, a knee, saddle and table supported by said column and movable relative thereto, the combination of transmission means for effecting movement of said knee, saddle and table, including a power source in said column, a feed drive shaft and a rapid traverse drive shaft in said column, a feed drive shaft and a rapid traverse drive shaft carried by said knee and operatively connected respectively to said corresponding shafts in said column, an infinitely variable drive mechanism in said knee driven by said feed drive shaft, means carried by said knee for adjusting said infinitely variable drive mechanism, a reversing and disconnecting mechanism in said transmission for each of said movable elements, a rapid traverse clutch in said rapid traverse transmission, means for engaging and disengaging said rapid traverse clutch, and an overrunning clutch operative upon engagement of said rapid traverse clutch to permit movement of said knee, saddle and table at rapid traverse rate independently of said feed drive transmission.

3. In a milling machine, a column, a hollow knee structure slidably mounted on said column, a work supporting table carried by said knee, an infinitely variable speed power transmission mechanism mounted within said hollow knee structure and operatively connected to actuate said work supporting table at any selected rate within a predetermined range, a control device including an indicating dial mounted on said knee, indicia on said dial arranged to form a scale indicating changes in feed rate by relatively small increments at low rates and by relatively large increments at high rates, a control shaft connected to be turned by said control device, a worm on said control shaft, a worm wheel disposed to be turned by said worm, a cam follower connected to be revolved by said worm wheel, and a cam of predetermined shape associated with said variable speed mechanism and arranged to cooperate with said cam follower in manner to effect adjustment of said mechanism in accordance with the scale of said control device indicating dial.

4. In a milling machine of the knee and column type, a hollow knee structure, a work table carried by said knee structure, an infinitely variable speed friction drive mechanism including tapered planet rollers and an encircling traction ring mounted within said hollow knee structure, means operatively connecting said friction drive mechanism to actuate said table at selected rate, means arranged to move said traction ring longitudinally of said rollers for adjusting said mechanism including a cam shaped to provide relatively small increments of adjustment at low rates and relatively large increments of adjustment at high rates, a rate adjusting device including an indicating dial mounted on said knee, a worm and worm wheel mechanism arranged to be turned by said adjusting device and operatively connected to actuate said cam mechanism, and indicia on said dial arranged to indicate the rate of movement of said table in accordance with the adjustment of said friction drive mechanism by said cam mechanism.

5. In a milling machine of the knee and column type, a hollow knee structure, a work table carried by said knee structure, an infinitely variable speed friction drive mechanism including tapered planet rollers and an encircling traction ring mounted within said hollow knee structure, means operatively connecting said drive mechanism to actuate said table, adjusting means slidably mounted in said knee and disposed to engage said traction ring to move it longitudinally for changing the speed ratio of said mechanism, control means mounted on said knee externally thereof for manual operation to adjust the rate of movement of said table, cam actuating follower means connected to be moved by said control means, and a cam on said adjusting means disposed to be engaged by said follower means said cam being shaped to provide for adjustment of said rate according to a predetermined scale.

6. In a milling machine of the knee and column type, an upstanding column structure, a hollow knee slidably mounted for vertical adjustment upon said column structure, said knee presenting an opening for receiving transmission mechanism, a saddle slidably mounted on said knee, a table slidably mounted on said saddle, a transmission bracket removably mounted on said knee in position to close said opening, an infinitely variable friction drive mechanism carried by said bracket within said hollow knee in manner to be removable therefrom with said bracket, distribution mechanism including a disconnecting and reversing unit for actuating said knee and a similar unit for actuating said saddle both connected to be driven by said friction drive mechanism and likewise mounted on said bracket for removal from said knee with said bracket and said friction drive mechanism as a unit, power driven means operatively connected to drive said friction drive mechanism, and transmission means operatively connecting said disconnecting and reversing units of said distribution mechanism to actuate said knee and said saddle respectively.

7. In a machine tool, a movable working element, a transmission mechanism arranged to move said working element, said mechanism including an infinitely variable drive apparatus, means to adjust said infinitely variable drive apparatus including an adjusting control member, a crank arm arranged to be turned by said control member, an actuating member disposed to be engaged and operated by said crank arm in moving through substantially a right angle, and a lineally moving adjusting element disposed to transmit movement from said actuating member to said infinitely variable drive apparatus, the arrangement being such that in effecting adjustments at high speeds the movement of the crank arm is largely in the direction of the lineal movement of said adjusting element and causes relatively coarse adjustments of said apparatus while in effecting adjustments at low speeds the movement of the crank arm is largely transverse to the direction of lineal movement of said adjusting element and results in relatively fine adjustments of said apparatus.

8. In a machine tool including a movable working element, power operated means for actuating said working element, a transmission mechanism including an infinitely variable speed changing apparatus operatively connected to transmit power from said power operated means to said working element, a lineally movable adjusting member operatively connected to adjust said speed changing apparatus, a cam groove formed in said lineally movable adjusting member, control mechanism for said adjusting member including a rotatable control member and an associated crank arm, cam follower means on said crank arm disposed to engage the cam groove in said lineally movable adjusting member, the arrangement of said crank arm and the shape of said cam groove being such that when said crank arm is turned by said control member in effecting adjustments in the high speed range said cam follower moves largely in the direction of movement of said adjusting member and causes relatively rapid movement of said member while in effecting adjustments in the low speed range said cam follower moves largely transverse to the direction of movement of said adjusting member and causes relatively slow movement of said member, according to a predetermined speed changing schedule.

JOSEPH B. ARMITAGE.